US012405932B2

(12) United States Patent
Han et al.

(10) Patent No.: US 12,405,932 B2
(45) Date of Patent: Sep. 2, 2025

(54) METHOD AND APPARATUS FOR MANAGING VEHICLE CALIBRATION DATABASE, AND STORAGE MEDIUM

(71) Applicant: NIO TECHNOLOGY (ANHUI) CO., LTD, Hefei (CN)

(72) Inventors: Yiqi Han, Shanghai (CN); Bohong Xiao, Shanghai (CN); Qizhuang Shen, Shanghai (CN); Zheng Liu, Shanghai (CN); Cheng Wang, Shanghai (CN); Yunwei He, Shanghai (CN); Xiang Li, Shanghai (CN); Tongzhou Zhou, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 180 days.

(21) Appl. No.: 18/180,236

(22) Filed: Mar. 8, 2023

(65) Prior Publication Data
US 2023/0289334 A1    Sep. 14, 2023

(30) Foreign Application Priority Data

Mar. 8, 2022  (CN) .......................... 202210218693.6

(51) Int. Cl.
*G06F 16/21*    (2019.01)
*B60R 25/01*    (2013.01)
(Continued)

(52) U.S. Cl.
CPC ........ *G06F 16/217* (2019.01); *G06F 16/2365* (2019.01); *H04W 4/40* (2018.02); *B60R 25/01* (2013.01); *B60R 25/24* (2013.01)

(58) Field of Classification Search
CPC ............................................... G06F 16/24544
(Continued)

(56) References Cited

U.S. PATENT DOCUMENTS

2008/0312861 A1\* 12/2008 Casto .................. G01R 35/005
702/85
2012/0198035 A1    8/2012 Matsuura et al.
(Continued)

FOREIGN PATENT DOCUMENTS

CN          106218551        12/2016
CN          110392088        10/2019
(Continued)

OTHER PUBLICATIONS

Extended Search Report for European Patent Application No. 23160699.7, dated Jul. 28, 2023, 6 pages.
(Continued)

*Primary Examiner* — Muluemebet Gurmu
(74) *Attorney, Agent, or Firm* — Sheridan Ross P.C.

(57) ABSTRACT

The disclosure relates to a method and an apparatus for managing a vehicle calibration database, and a storage medium. The portable device includes a communication unit and a processing unit. The method includes: A. generating a calibration database including one or more sets of calibration data and a default label set associated with each set of calibration data; B. in response to a calibration request, obtaining a current label set associated with a user account from a vehicle end and a digital key end; C. separately calculating relevances between the current label set and the one or more default label sets; and D. selecting a set of calibration data from the calibration database based at least on the relevances as calibration data to be distributed. The solution for managing a vehicle calibration database proposed in the disclosure can reduce the randomness of calibration data distribution, improve the positioning accuracy of the digital key and user experience, and adaptively adjust and update the existing calibration database at the same time.

15 Claims, 2 Drawing Sheets

(51) Int. Cl.
  *B60R 25/24* (2013.01)
  *G06F 16/23* (2019.01)
  *H04W 4/40* (2018.01)

(58) Field of Classification Search
  USPC .......................................................... 707/690
  See application file for complete search history.

(56) References Cited

U.S. PATENT DOCUMENTS

| | | | | |
|---|---|---|---|---|
| 2014/0075517 A1* | 3/2014 | Alrabady | .............. | G06F 21/572 |
| | | | | 726/4 |
| 2014/0075579 A1* | 3/2014 | Baltes | .................... | G06F 21/51 |
| | | | | 726/30 |
| 2019/0234920 A1* | 8/2019 | Rangel | ................... | G08B 21/12 |
| 2022/0109662 A1* | 4/2022 | Jenkins | ................. | H04W 12/35 |
| 2024/0346857 A1* | 10/2024 | Gintz | ........................ | G06F 8/65 |

FOREIGN PATENT DOCUMENTS

| | | |
|---|---|---|
| CN | 111432337 | 7/2020 |
| CN | 111768528 | 10/2020 |
| CN | 112243020 | 1/2021 |
| CN | 113612824 | 11/2021 |
| WO | WO 2021/212866 | 10/2021 |

OTHER PUBLICATIONS

Official Action with Machine Translation for China Patent Application No. 202210218693.6, dated Oct. 8, 2024, 16 pages.

* cited by examiner

METHOD AND APPARATUS FOR MANAGING VEHICLE CALIBRATION DATABASE, AND STORAGE MEDIUM

This application claims the benefit of China Patent Application No. 202210218693.6 filed Mar. 8, 2022, the entire contents of which are incorporated herein by reference in its entirety.

TECHNICAL FIELD

The disclosure relates to the field of automobiles, and more specifically relates to a method and a data processing apparatus for managing a vehicle calibration database, a storage medium, and a terminal device having a digital key function.

BACKGROUND

Nowadays, more and more passenger vehicles use a digital key that uses a mobile phone via Bluetooth to replace a traditional physical key. In a Bluetooth positioning process, a digital key based on Bluetooth technology relies on strength information of a signal between a vehicle's Bluetooth antenna and a smart device for positioning. During the Bluetooth positioning, a Bluetooth positioning algorithm is used to calculate a position of the smart device relative to the vehicle based on the current strength of the signal between the vehicle's Bluetooth antenna and the smart device, in combination with calibration data.

However, compared with physical keys, digital keys have problems such as instability and poor positioning effect. This is mainly caused by different hardware chips, antennas, and powers that are used by different mobile phone brands and models. If a vehicle end responds to mobile phone requests at a fixed receiving power, or adapts to a combination of hundreds of mainstream smartphones or smart wearable devices on the market using one set of calibration parameters, there is great randomness, which results in a very poor performance experience.

In addition, at present, cloud service platforms for most head units and mobile phone applications are not interconnected or interoperable. For example, cloud services for a head unit and a mobile phone are provided by two or more suppliers. Most platforms, including OnStar, Mercedes Cloud, and ECARX, support transfer of only a part of public data (for example, user names and simple instructions such as remote operation commands), and no existing interoperable platform database can implement adaptive optimization of mobile phones and head units.

BRIEF SUMMARY

According to one aspect of the disclosure, a method for managing a vehicle calibration database is provided, the method including the following steps: A. generating a calibration database including one or more sets of calibration data and a default label set associated with each set of calibration data; B. in response to a calibration request, obtaining a current label set associated with a user account from a vehicle end and a digital key end; C. separately calculating relevances between the current label set and the one or more default label sets; and D. selecting a set of calibration data from the calibration database based at least on the relevances as calibration data to be distributed.

As an alternative or addition to the foregoing solution, the method according to an embodiment of the disclosure further includes: E. transmitting the calibration data to be distributed to the vehicle end and the digital key end, the digital key end including a smartphone or a smart wearable device.

As an alternative or addition to the foregoing solution, in the method according to an embodiment of the disclosure, the label set includes one or more of the following: a vehicle model label, a device type label, a device model label, an operating system version label, an application version label, or an antenna performance label.

As an alternative or addition to the foregoing solution, in the method according to an embodiment of the disclosure, in step C, the relevances R between the current label set and the one or more default label sets are calculated using the following formulas:

$$R = a \times R_1 + b \times R_2 + c \times R_3 + d \times R_4 + e \times R_5 + f \times R_6$$

$$a+b+c+d+e+f=1$$

where $R_1$ is a device type relevance, $R_2$ is an operating system relevance, $R_3$ is a device model relevance, $R_4$ is an application version relevance, $R_5$ is an antenna performance relevance, $R_6$ is an adaptive relevance, and a, b, c, d, e, and f are preset coefficients.

As an alternative or addition to the foregoing solution, in the method according to an embodiment of the disclosure, step D includes: D1. if a maximum relevance among the relevances is greater than or equal to a first threshold, selecting calibration data corresponding to the maximum relevance as the calibration data to be distributed; and D2. if the maximum relevance among the relevances is less than the first threshold, selecting the default calibration data as the calibration data to be distributed.

As an alternative or addition to the foregoing solution, in the method according to an embodiment of the disclosure, step D further includes: D3. obtaining positioning parameters in the calibration process from the vehicle end and the digital key end, the positioning parameters including an antenna field strength parameter, a distance parameter, a distance-field strength characteristic curve, and a result parameter; D4. training a ranging model using the positioning parameters, and generating new calibration data based on the ranging model; and D5. updating the calibration database with the new calibration data.

According to another aspect of the disclosure, a data processing apparatus for managing a vehicle calibration database is provided, the apparatus including: a memory; a processor; and a computer program stored on the memory and executable on the processor, where the execution of the computer program causes the following steps to be performed: A. generating a calibration database including one or more sets of calibration data and a default label set associated with each set of calibration data; B. in response to a calibration request, obtaining a current label set associated with a user account from a vehicle end and a digital key end; C. separately calculating relevances between the current label set and the one or more default label sets; and D. selecting a set of calibration data from the calibration database based at least on the relevances as calibration data to be distributed.

As an alternative or addition to the foregoing solution, in the apparatus according to an embodiment of the disclosure, the execution of the computer program further causes the following step to be performed: E. transmitting the calibration data to be distributed to a vehicle controller and a key device, the key device including a smartphone or a smart wearable device.

As an alternative or addition to the foregoing solution, in the apparatus according to an embodiment of the disclosure, the label set includes one or more of the following: a vehicle model label, a device type label, a device model label, an operating system version label, an application version label, or an antenna performance label.

As an alternative or addition to the foregoing solution, in the apparatus according to an embodiment of the disclosure, the execution of the computer program causes step C to be performed as follows:

calculating the relevances R between the current label set and the one or more default label sets using the following formulas:

$$R = a \times R_1 + b \times R_2 + c \times R_3 + d \times R_4 + e \times R_5 + f \times R_6$$

$$a+b+c+d+e+f=1$$

where $R_1$ is a device type relevance, $R_2$ is an operating system relevance, $R_3$ is a device model relevance, $R_4$ is an application version relevance, $R_5$ is an antenna performance relevance, $R_6$ is an adaptive relevance, and a, b, c, d, e, and f are preset coefficients.

As an alternative or addition to the foregoing solution, in the apparatus according to an embodiment of the disclosure, the execution of the computer program causes step D to be performed as follows: D1. if a maximum relevance among the relevances is greater than or equal to a first threshold, selecting calibration data corresponding to the maximum relevance as the calibration data to be distributed; and D2. if the maximum relevance among the relevances is less than the first threshold, selecting the default calibration data as the calibration data to be distributed.

As an alternative or addition to the foregoing solution, in the apparatus according to an embodiment of the disclosure, the execution of the computer program further causes step D to be performed as follows: D3. obtaining positioning parameters in the calibration process from the vehicle end and the digital key end, the positioning parameters including an antenna field strength parameter, a distance parameter, a distance-field strength characteristic curve, and a result parameter; D4. training a ranging model using the positioning parameters, and generating new calibration data based on the ranging model; and D5. updating the calibration database with the new calibration data.

According to still another aspect of the disclosure, a computer-readable storage medium storing a computer program is provided, where when the program is executed by a processor, any one of the methods described above is implemented.

According to yet another aspect of the disclosure, a terminal device having a digital key function is provided, the terminal device including: a memory; a processor; and a computer program stored on the memory and executable on the processor, where the execution of the computer program causes the following steps to be performed: A. in response to a digital key activation command, obtaining one or more default label sets from a calibration database end; B. separately calculating relevances between a current label set associated with a user account and the one or more default label sets; C. sending a calibration request to the calibration database end based at least on the relevances to download corresponding calibration data.

As an alternative or addition to the foregoing solution, in the device according to an embodiment of the disclosure, the execution of the computer program causes step C to be performed as follows: C1. if a maximum relevance among the relevances is greater than or equal to a first threshold, sending a first request to the calibration database end to download calibration data corresponding to the maximum relevance; and C2. if the maximum relevance among the relevances is less than the first threshold, sending a second request to the calibration database end to download default calibration data.

As an alternative or addition to the foregoing solution, in the device according to an embodiment of the disclosure, the execution of the computer program further causes one or more of the following steps to be performed: D. downloading the corresponding calibration data from the calibration database end; E. obtaining positioning parameters in the calibration process, the positioning parameters including an antenna field strength parameter, a distance parameter, a distance-field strength characteristic curve, and a result parameter; and F. transmitting the positioning parameters to the calibration database end to update the calibration database.

The solution for managing a vehicle calibration database proposed in the disclosure can perform labeling management of the user account information (for example, information such as the vehicle model used by the user, the device type, the device model, the operating system version, the application version, or the antenna performance), and innovatively proposes the concept of relevance between the current user information and the calibration data (that is, the relevance between the current label set associated with the user account and the default label set existing on the calibration database end), so that the user can quickly and efficiently download the calibration data that match their current account information, thereby reducing the randomness of calibration data distribution and improving the positioning accuracy of the digital key and user experience.

In addition, the solution for managing a vehicle calibration database proposed in the disclosure can record the positioning parameters in real time according to the actual calibration situation of the digital key, and adaptively adjust the stored calibration data. According to some embodiments, the calibration data corresponding to the maximum relevance may be downloaded when the relevance is high (for example, the digital key end is a known device for the calibration database, or a key label is known), to provide the best positioning experience. According to other embodiments, the default calibration data may be downloaded when the relevance is low (for example, a key label on the digital key end is unknown for the calibration database); in addition, positioning parameters in the calibration process are frequently recorded and uploaded to train and obtain new calibration data, so as to update the existing calibration database.

In addition, the disclosure proposes a solution for interconnection and interoperability between a vehicle end, a digital key end, and a calibration database end, which obviates the need for storing all calibration data corresponding to different devices on the vehicle end, thereby saving the storage space of the vehicle end.

BRIEF DESCRIPTION OF THE SEVERAL VIEWS OF THE DRAWINGS

The above-mentioned and/or other aspects and advantages of the disclosure will become more apparent and more readily appreciated from the following description of various aspects in conjunction with the accompanying drawings, in which the same or similar units are denoted by the same reference numerals. In the accompanying drawings.

DETAILED DESCRIPTION

In this specification, the disclosure is described more fully with reference to the accompanying drawings in which schematic embodiments of the disclosure are illustrated. However, the disclosure may be implemented in different forms, and should not be construed as being limited to the embodiments provided herein. The embodiments provided herein are intended to make the disclosure of this specification full and complete, to convey the scope of protection of the disclosure more fully to those skilled in the art.

It should be noted that the terms such as "first" and "second" herein are intended to distinguish between similar objects, and do not necessarily describe a sequence of objects in terms of time, space, size, and the like. In addition, unless otherwise specified, the terms "including/comprising", "having", and similar expressions herein are intended to mean a non-exclusive inclusion.

In this specification, the term "vehicle" or other similar terms include general motor vehicles, such as passenger vehicles (including sport utility vehicles, buses, trucks, etc.) and various commercial vehicles, and include hybrid vehicles, electric vehicles, plug-in hybrid electric vehicles, etc. A hybrid vehicle is a vehicle with two or more power sources, such as a vehicle powered by a gasoline engine and an electric motor.

In this specification, the term "digital key end" refers to any electronic device that can be used to unlock a vehicle, which may include, but is not limited to: a wearable electronic device such as a smart watch, a smart bracelet, a smart necklace, or a smart key, or a mobile terminal such as a smartphone.

For a better understanding of the disclosure, the meaning of digital key calibration is briefly described herein. The digital key can provide for keyless entry and one-button start. In order to ensure safety, an onboard communication module is required to utilize a sensor to comprehensively determine whether a distance between the digital key end (for example, a smart key or a mobile phone) and the vehicle is within an effective range (for example, less than or equal to 3 m). Considering differences between various digital key ends, in order to ensure accurate positioning of the digital key end by the vehicle, calibration is required before use. In the calibration process, received signal strength indicators (RSSIs) of the digital key end at different positions inside and outside the vehicle need to be acquired as positioning parameters.

Various exemplary embodiments according to the disclosure will be described below in detail with reference to the accompanying drawings.

Figure 1:
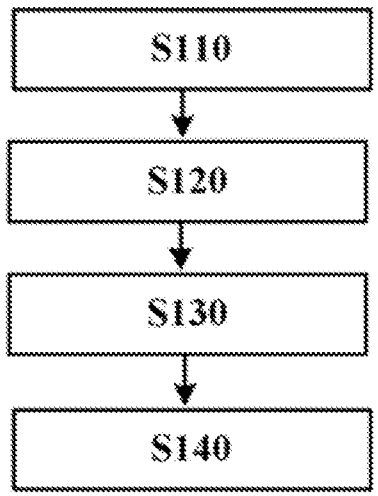
FIG. 1 is a schematic flowchart of a method 10 for managing a vehicle calibration database according to an embodiment of the disclosure.

Referring now to FIG. 1, FIG. 1 is a schematic flowchart of a method 10 for managing a vehicle calibration database according to an embodiment of the disclosure.

In step S110, a calibration database including one or more sets of calibration data and a default label set associated with each set of calibration data is generated.

For example, the calibration data refers to a threshold distance parameter for determining whether to perform vehicle state switching (e.g., auto unlock, auto lock, or trunk opening). Optionally, the calibration data may include one or more of a key activation determination threshold, a vehicle start determination threshold, a vehicle keyless entry determination threshold, a vehicle welcome determination threshold, a vehicle auto unlock determination threshold, a vehicle auto lock determination threshold, and a trunk opening determination threshold.

It can be understood that digital key calibration data of each vehicle model that matches different digital key ends needs to be pre-stored in the calibration database (for example, a cloud database). Optionally, in step S110, digital key calibration data of each vehicle model corresponding to a digital key end of each device type, each device model, each operating system version, each application version, and each antenna performance version may be obtained in advance through manual calibration, and stored in the calibration database.

Optionally, a label for each device type, each device model, each operating system version, each application version, and each antenna performance version may further be generated in advance as a default label, and the label set is matched with corresponding calibration data in a hash manner. For example, a first set of calibration data and its corresponding first label set may be stored in the calibration database, a second set of calibration data and its corresponding second label set may be stored in the calibration database, and so on. In the calibration database, each set of calibration data is in a one-to-one correspondence with its default label set.

In step S120, in response to a calibration request, a current label set associated with a user account is obtained from a vehicle end and a digital key end.

For example, when a user starts a smart key program on the digital key end, the digital key end may send a calibration request to a calibration database end over a network and access the calibration database. Optionally, the vehicle end may alternatively send a calibration request to the calibration database end and access the calibration database.

Optionally, after receiving the calibration request from the vehicle end and/or the digital key end, the calibration database end may verify identity information of the vehicle end and/or digital key end, and after the verification is successful, send response information indicating the successful identity verification to the vehicle end and/or digital key end. Optionally, after the successful identity verification, the vehicle end and the digital key end may send the current label set associated with the user account to the calibration database end.

Optionally, the current label set may include one or more of the following: a vehicle model label, a device type label, a device model label, an operating system version label, an application version label, or an antenna performance label.

In step S130, relevances between the current label set and the one or more default label sets may be separately calculated. For example, the relevances may be calculated by the calibration database end. The relevance reflects the degree of matching between the current label set and the stored default label set.

Optionally, the relevances R between the current label set and the one or more default label sets may be calculated using the following formulas:

$$R = a \times R_1 + b \times R_2 + c \times R_3 + d \times R_4 + e \times R_5 + f \times R_6 \quad \text{(Formula 1)}$$

$$a + b + c + d + e + f = 1 \quad \text{(Formula 2)}$$

where $R_1$ is a device type relevance, $R_2$ is an operating system relevance, $R_3$ is a device model relevance, $R_4$ is an application version relevance, $R_5$ is an antenna performance relevance, $R_6$ is an adaptive relevance, and a, b, c, d, e, and f are preset coefficients.

Optionally, a=0.4, b=0.2, c=0.2, d=0.1, e=0.05, and f=0.05.

Optionally, the device type relevance $R_1$ represents the degree of matching between a device type of the current digital key end and a default device type. For example, if the device type of the current digital key end is a smartphone, and the default device type represented by the device type label in the default label set is a smart watch, then $R_1$=0; and if the device type of the current digital key end and the default device type represented by the device type label in the default label set are both smart watches, then $R_1$=1.

Optionally, the operating system relevance $R_2$ represents the degree of matching between an operating system of the current digital key end and a default operating system. For example, if the operating system of the current digital key end and the default operating system represented by the operating system label in the default label set are systems across platforms (for example, the current operating system is Linux, and the default operating system is RTOS), then $R_2$=0; if the operating system of the current digital key end and the default operating system represented by the operating system label in the default label set are systems across platforms of the same type (for example, the current operating system is Linux, and the default operating system is RTOS), then $R_2$=0.5; if the operating system of the current digital key end and the default operating system represented by the operating system label in the default label set are systems across operating system versions (for example, the current operating system is Linux xx.1, and the default operating system is Linux xx.2), then $R_2$=0.8; and if the operating system of the current digital key end and the default operating system represented by the operating system label in the default label set are the same, then $R_2$=1.

Optionally, the device model relevance $R_3$ represents the degree of matching between a device model of the current digital key end and a default device model. For example, if the device model of the current digital key end and the default device model represented by the device model label in the default label set are models across brands (for example, the current device model is Android OPPO, and the default device model is Android VIVO), then $R_3$=0; if the device model of the current digital key end and the default device model represented by the device model label in the default label set are models across model platforms (for example, the current device model is Huawei Mate 40, and the default device model is Huawei Mate 40 pro), then $R_3$=0.5; and if the device model of the current digital key end and the default device model represented by the device model label in the default label set are the same, then $R_3$=1.

Optionally, the application version relevance $R_4$ represents the degree of matching between an application version of the current digital key end and a default application version. For example, if the application version of the current digital key end and the default application version represented by the application version label in the default label set are versions across major versions, then $R_4$=0; if they are versions across minor versions, then $R_4$=0.2; and if they are equal, then $R_4$=1.

Optionally, the antenna performance relevance $R_5$ represents the degree of matching between an antenna performance version of the current digital key end and a default antenna performance version. For example, if the antenna performance version of the current digital key end and the default antenna performance version represented by the antenna performance version label in the default label set are versions across major versions (for example, the current antenna performance version is Bluetooth 5.0, and the default antenna performance version is Bluetooth 4.0), then $R_5$=0; if they are versions across minor versions (for example, the current antenna performance version is Bluetooth 4.3, and the default antenna performance version is Bluetooth 4.2), then $R_5$=0.2; and if they are equal, then $R_5$=1.

Optionally, the adaptive relevance $R_6$ is a preset fixed value, or represents the degree of matching of other variable environmental factors such as a software environment version.

In step S140, a set of calibration data is selected from the calibration database based at least on the relevances as calibration data to be distributed. For example, the calibration data to be distributed may be selected based on the magnitudes of the one or more calculated relevances.

Optionally, calibration data corresponding to a calculated maximum relevance may be selected as the calibration data to be distributed. For example, if a relevance between the current label set and a first default label set is 0.32, and a relevance between the current label set and a second default label set is 0.74, a second set of calibration data corresponding to the second default label set may be directly selected as the calibration data to be distributed.

Optionally, the calibration data to be distributed may alternatively be selected by comparing the calculated relevance with a preset threshold.

For example, if a maximum relevance among the relevances is greater than or equal to a first threshold, calibration data corresponding to the maximum relevance is selected as the calibration data to be distributed; and if the maximum relevance among the relevances is less than the first threshold, the default calibration data is selected as the calibration data to be distributed. For example, the first threshold is 0.8.

The range of the preset value (for example, the first threshold) described herein may be set according to actual requirements, and is not limited to the range shown in this embodiment.

For example, if the calculated maximum relevance is high (for example, greater than or equal to 0.8), it can be considered that the current digital key end is a known device for the calibration database, or that a key label (for example, the device type label, the operating system label, or the device model label) is known. In this case, the calibration data corresponding to the maximum relevance may be selected as the calibration data to be distributed, so as to provide the best positioning experience.

For example, if the calculated maximum relevance is low (for example, less than 0.8), it can be considered that the current digital key end is an unknown device for the calibration database, or that a key label is unknown. In this case, the default calibration data may be directly selected as the calibration data to be distributed. In addition, positioning parameters in the calibration process are frequently recorded and uploaded to train and obtain new calibration data, and the existing calibration database is updated with the new calibration data.

Optionally, the calibration database may be updated as follows: obtaining positioning parameters in the calibration process from the vehicle end and the digital key end, the positioning parameters including an antenna field strength parameter, a distance parameter, a distance-field strength characteristic curve, and a result parameter; training a ranging model using the positioning parameters, to generate new calibration data; and updating the calibration database with the new calibration data.

For example, the ranging model is constructed based on a training data set including annotations of the positioning parameters (for example, the antenna field strength parameter, the distance parameter, and the distance-field strength characteristic curve) and the result parameter characterizing whether the vehicle successfully performs vehicle state switching (for example, auto unlock, auto lock, or trunk opening).

For example, the vehicle end and the digital key end may perform calibration based on the calibration data downloaded from the calibration database. Optionally, the vehicle end and the digital key end can perform data communication via a Bluetooth connection, a near field communication (NFC) connection, an ultra wideband (UWB) connection, etc., and an accurate position of the digital key end is determined by the vehicle end. The vehicle end may determine whether the digital key end is outside or inside the vehicle, as well as a distance between the digital key end and the vehicle end, based on an RSSI value of the current digital key end and the calibration data. After determining the accurate position of the digital key end, the vehicle end may send the position information to a passive entry passive start (PEPS) system to perform a subsequent operation (for example, opening the door or starting the vehicle). This content is not the focus of the disclosure, and will not be described in detail here.

Optionally, after the end of the calibration process, the vehicle end and/or the digital key end may transmit the positioning parameters (for example, the antenna field strength parameter, the distance parameter, the distance-field strength characteristic curve, and the result parameter) recorded in the calibration process to the calibration database end. The calibration database end may train the ranging model using the positioning parameters, and continuously update and adaptively adjust the existing calibration data in the calibration database.

Optionally, the calibration database may be maintained manually on a regular basis, and invalid calibration data may be discarded or merged. Optionally, a child class calibration database may also be automatically called or completed from a parent class calibration database according to a preset global dependency and inheritance relationship. For example, an iPhone X can automatically inherit calibration data of an iPhone 8, and an Apple watch can automatically inherit calibration data of an iPhone.

Figure 2:
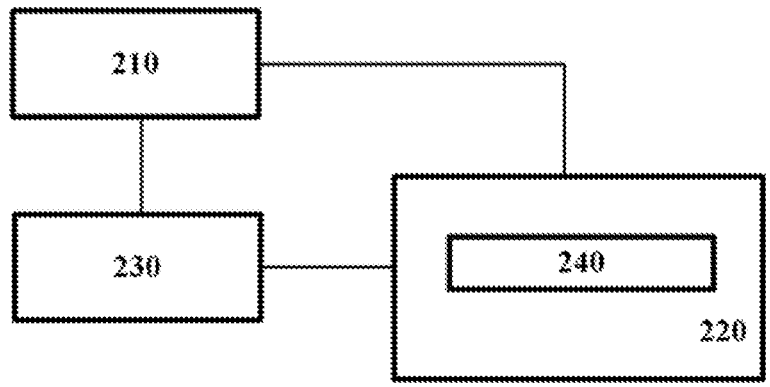
FIG. 2 is a schematic block diagram of a data processing apparatus 20 for managing a vehicle calibration database according to an embodiment of the disclosure.

Referring further to FIG. 2, FIG. 2 is a schematic block diagram of a data processing apparatus 20 for managing a vehicle calibration database according to an embodiment of the disclosure. The apparatus 20 shown in FIG. 2 may be configured to implement the procedure shown in FIG. 1.

As shown in FIG. 2, the data processing apparatus 20 includes a communications unit 210, a memory 220 (for example, a non-volatile memory such as a flash memory, a ROM, a hard disk drive, a magnetic disk, or an optical disc), a processor 230 (for example, a microprocessor or a microcontroller), and a computer program 240 stored on the memory 220 and executable on the processor 230.

The communications unit 210, as a communications interface, is configured to establish a communication connection between the apparatus and an external device or network (for example, a vehicle end or a digital key end).

The memory 220 stores the computer program 240 executable by the processor 230. The processor 230 is configured to execute the computer program 240 to implement the corresponding procedure for managing a vehicle calibration database. The procedure for managing a vehicle calibration database has been described in detail above and will not be repeated here.

Figure 3:
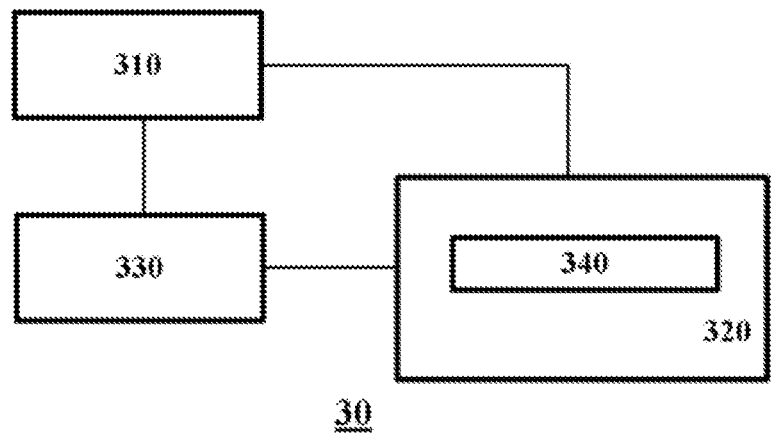
FIG. 3 is a schematic block diagram of a terminal device 30 having a digital key function according to an embodiment of the disclosure.

FIG. 3 is a schematic block diagram of a terminal device 30 having a digital key function according to an embodiment of the disclosure. For example, the terminal device 30 may be a wearable electronic device such as a smart watch, a smart bracelet, a smart necklace, or a smart key, or may be a mobile terminal such as a smartphone.

As shown in FIG. 3, a terminal device 30 includes a communications unit 310, a memory 320, a processor 330, and a computer program 340 stored on the memory 320 and executable on the processor 330.

The communications unit 310, as a communications interface, is configured to establish a communication connection between the apparatus and an external device or network (for example, a vehicle end or a calibration database end).

The memory 320 stores the computer program 340 executable by the processor 330. The processor 330 is configured to execute the computer program 340 to implement a calibration data download procedure as shown in FIG. 4.

Figure 4:
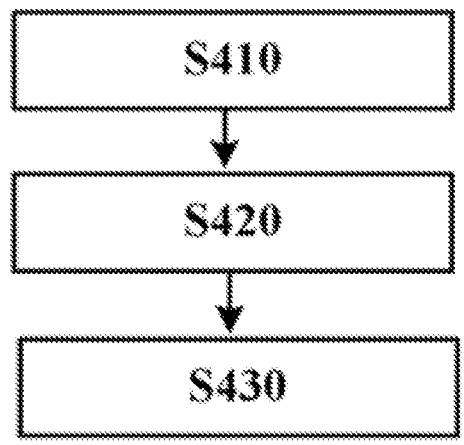
FIG. 4 is a schematic flowchart of a calibration data download procedure 40 according to an embodiment of the disclosure.

Referring further to FIG. 4, FIG. 4 is a schematic flowchart of a calibration data download procedure 40 according to an embodiment of the disclosure.

In step S410, a vehicle end or a digital key end, in response to a digital key activation command, obtains one or more default label sets from a calibration database end.

In step S420, the vehicle end or the digital key end separately calculates relevances between a current label set associated with a user account and the one or more default label sets.

In step S430, the vehicle end or the digital key end sends a calibration request to the calibration database end based at least on the relevances to download corresponding calibration data. Optionally, step S410 includes: if a maximum relevance among the relevances is greater than or equal to a first threshold, sending a first request to the calibration database end to download calibration data corresponding to the maximum relevance; and C2. if the maximum relevance among the relevances is less than the first threshold, sending a second request to the calibration database end to download default calibration data.

Optionally, the procedure 40 may further include step S440: downloading the corresponding calibration data from the calibration database end.

Optionally, the procedure 40 may further include step S450: obtaining positioning parameters in the calibration process, the positioning parameters including an antenna field strength parameter, a distance parameter, a distance-field strength characteristic curve, and a result parameter; and optionally, the procedure 40 may further include step S460: transmitting the positioning parameters to the calibration database end to update the calibration database.

According to another aspect of the disclosure, a computer-readable storage medium storing a computer program is further provided, where when the program is executed by a processor, the method shown in FIG. 1 or FIG. 4 is implemented. The computer-readable storage medium may include a random access memory (RAM) (such as a synchronous dynamic random access memory (SDRAM)), a read-only memory (ROM), a non-volatile random access memory (NVRAM), an electrically erasable programmable read-only memory (EEPROM), a flash memory, or another known storage medium.

According to some embodiments of the disclosure, labeling management of user account information and calculating the relevances between the current user information and the default label set enable the user to quickly and efficiently download the calibration data that match their current account information, thereby reducing the randomness of calibration data distribution and improving the positioning accuracy of the digital key and user experience.

According to some embodiments of the disclosure, the positioning parameters in the actual calibration process of the digital key can be recorded and uploaded to train and obtain new calibration data, so that the data in the calibration database can be adaptively updated according to changes of the digital key end and the actual positioning situation.

It should be understood that, some of the block diagrams shown in the accompanying drawings of the disclosure are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It should also be understood that, in some alternative embodiments, the functions/steps included in the foregoing methods may not occur in the order shown in the flowchart. For example, two functions/steps shown in sequence may be executed substantially simultaneously or even in a reverse order. This specifically depends on the functions/steps involved.

In addition, those skilled in the art readily understand that the method provided in the foregoing one or more embodiments of the disclosure can be implemented by using a computer program. For example, when a computer storage medium (for example, a USB flash drive) storing the computer program is connected to a computer, the method in one or more embodiments of the disclosure can be performed by executing the computer program.

Although only some implementations of the disclosure are described above, a person of ordinary skill in the art should understand that the disclosure may be implemented in multiple other forms without departing from the essence and scope of the disclosure. Accordingly, the presented examples and implementations are considered to be illustrative rather than restrictive, and the disclosure may encompass various modifications and replacements without departing from the spirit and scope of the disclosure that are defined by the appended claims.

What is claimed is:

1. A method for managing a vehicle calibration database, comprising the following steps:
   A. generating a calibration database comprising one or more sets of calibration data and a default label set associated with each set of calibration data;
   B. in response to a calibration request, obtaining a current label set associated with a user account from a vehicle end and a digital key end;
   C. separately calculating relevances between the current label set and the one or more default label sets;
   D. selecting a set of calibration data from the calibration database based at least on the relevances as calibration data to be distributed;
   E. transmitting the selected set of calibration data to the vehicle end and the digital key end for use in a calibration process, with the selected set of calibration data being used to improve a positioning accuracy of the digital key end as determined by the vehicle end during the calibration process;
   F. obtaining positioning parameters in the calibration process from the vehicle end and the digital key end;
   G. training a ranging model using the positioning parameters, and generating new calibration data based on the ranging model; and
   H. updating the calibration database with the new calibration data.

2. The method according to claim 1, wherein the digital key end comprises a smartphone or a smart wearable device.

3. The method according to claim 1, wherein the label set comprises one or more of the following: a vehicle model label, a device type label, a device model label, an operating system version label, an application version label, or an antenna performance label.

4. The method according to claim 1, wherein in step C, the relevances R between the current label set and the one or more default label sets are calculated using the following formulas:

$$R = a \times R_1 + b \times R_2 + c \times R_3 + d \times R_4 + e \times R_5 + f \times R_6$$

$$a+b+c+d+e+f=1$$

wherein $R_1$ is a device type relevance, $R_2$ is an operating system relevance, $R_3$ is a device model relevance, $R_4$ is an application version relevance, $R_5$ is an antenna performance relevance, $R_6$ is an adaptive relevance, and a, b, c, d, e, and f are preset coefficients.

5. The method according to claim 1, wherein step D comprises:
   D1. if a maximum relevance among the relevances is greater than or equal to a first threshold, selecting a set of calibration data corresponding to the maximum relevance as the calibration data to be distributed; and
   D2. if the maximum relevance among the relevances is less than the first threshold, selecting the default calibration data as the calibration data to be distributed.

6. The method according to claim 1, wherein
the positioning parameters comprise an antenna field strength parameter, a distance parameter, a distance-field strength characteristic curve, and a result parameter.

7. A data processing apparatus for managing a vehicle calibration database, comprising:
   a memory;
   a processor; and
   a computer program stored on the memory and executable on the processor, wherein the execution of the computer program causes the following steps to be performed:
   A. generating a calibration database comprising one or more sets of calibration data and a default label set associated with each set of calibration data;
   B. in response to a calibration request, obtaining a current label set associated with a user account from a vehicle end and a digital key end;
   C. separately calculating relevances between the current label set and the one or more default label sets;

D. selecting a set of calibration data from the calibration database based at least on the relevances as calibration data to be distributed;

E. transmitting the selected set of calibration data to the vehicle end and the digital key end for use in a calibration process, with the selected set of calibration data being used to improve a positioning accuracy of the digital key end as determined by the vehicle end during the calibration process;

F. obtaining positioning parameters in the calibration process from the vehicle end and the digital key end;

G. training a ranging model using the positioning parameters, and generating new calibration data based on the ranging model; and H. updating the calibration database with the new calibration data.

8. The apparatus according to claim 7, wherein the key device comprises a smartphone or a smart wearable device.

9. The apparatus according to claim 7, wherein the label set comprises one or more of the following: a vehicle model label, a device type label, a device model label, an operating system version label, an application version label, or an antenna performance label.

10. The apparatus according to claim 7, wherein the execution of the computer program causes step C to be performed as follows: calculating the relevances R between the current label set and the one or more default label sets using the following formulas:

$$R = a \times R_1 + b \times R_2 + c \times R_3 + d \times R_4 + e \times R_5 + f \times R_6$$

$$a+b+c+d+e+f=1$$

wherein $R_1$ is a device type relevance, $R_2$ is an operating system relevance, $R_3$ is a device model relevance, $R_4$ is an application version relevance, $R_5$ is an antenna performance relevance, $R_6$ is an adaptive relevance, and a, b, c, d, e, and f are preset coefficients.

11. The apparatus according to claim 7, wherein the execution of the computer program causes step D to be performed as follows:

D1. if a maximum relevance among the relevances is greater than or equal to a first threshold, selecting a set of calibration data corresponding to the maximum relevance as the calibration data to be distributed; and D2. if the maximum relevance among the relevances is less than the first threshold, selecting the default calibration data as the calibration data to be distributed.

12. The apparatus according to claim 7, wherein the positioning parameters comprise an antenna field strength parameter, a distance parameter, a distance-field strength characteristic curve, and a result parameter.

13. A terminal device having a digital key function, comprising:
a memory;
a processor; and
a computer program stored on the memory and executable on the processor, wherein the execution of the computer program causes the following operations:

A. in response to a digital key activation command, obtaining one or more default label sets from a calibration database end;

B. separately calculating relevances between a current label set associated with a user account and the one or more default label sets;

C. sending a calibration request to the calibration database end based at least on the relevances to download corresponding calibration data;

D. downloading the corresponding calibration data from the calibration database end for use in a calibration process performed by a vehicle end and the terminal device, with the corresponding calibration data being used to improve a positioning accuracy of the terminal device as determined by the vehicle end during the calibration process;

E. obtaining positioning parameters in the calibration process; and

F. transmitting the positioning parameters to the calibration database end to update the calibration database.

14. The terminal device according to claim 13, wherein the execution of the computer program causes step C to be performed as follows:

C1. if a maximum relevance among the relevances is greater than or equal to a first threshold, sending a first request to the calibration database end to download calibration data corresponding to the maximum relevance; and C2. if the maximum relevance among the relevances is less than the first threshold, sending a second request to the calibration database end to download default calibration data.

15. The terminal device according to claim 13, wherein the positioning parameters comprise an antenna field strength parameter, a distance parameter, a distance-field strength characteristic curve, and a result parameter.

* * * * *